United States Patent

Beer

[15] 3,650,699
[45] Mar. 21, 1972

[54] ANALYTICAL APPARATUS HAVING PRESSURE REGULATOR AND FLUSHING MEANS

[72] Inventor: Palle-Finn Beer, Lidingo, Sweden
[73] Assignee: AGA Aktiebolag, Lidingo, Sweden
[22] Filed: Feb. 5, 1970
[21] Appl. No.: 8,966

[30] Foreign Application Priority Data

Feb. 5, 1969 Sweden.............................1492/1969

[52] U.S. Cl.................................23/259, 23/292, 137/240, 137/505.41, 141/25, 222/335
[51] Int. Cl.............................................B01l 3/02
[58] Field of Search................23/259, 292; 141/25, 26, 27; 137/568; 222/335

[56] References Cited

UNITED STATES PATENTS 3,081,158  3/1963  Winter.....................................23/253
3,273,402  9/1966  Farr......................................23/259 X

*Primary Examiner*—M. Cary Nelson
*Assistant Examiner*—Richard Gerard
*Attorney*—Larson, Taylor & Hinds

[57] ABSTRACT

An apparatus for regulating the liquid pressure in a measuring pipette which comprises a measuring pipette, a pump, a pressure equalizer, a first means for conveying liquid for said pump to said pressure equalizer, a second means for conveying liquid from said pressure equalizer to said measuring pipette, said pressure equalizer comprising a variable volume chamber having an outlet communicating with said second means and an inlet communicating with said first means, valve means disposed in said variable volume chamber, said valve means communicating with said inlet and adapted to close when the variable volume chamber reaches a predetermined volume.

6 Claims, 1 Drawing Figure

Patented March 21, 1972 3,650,699
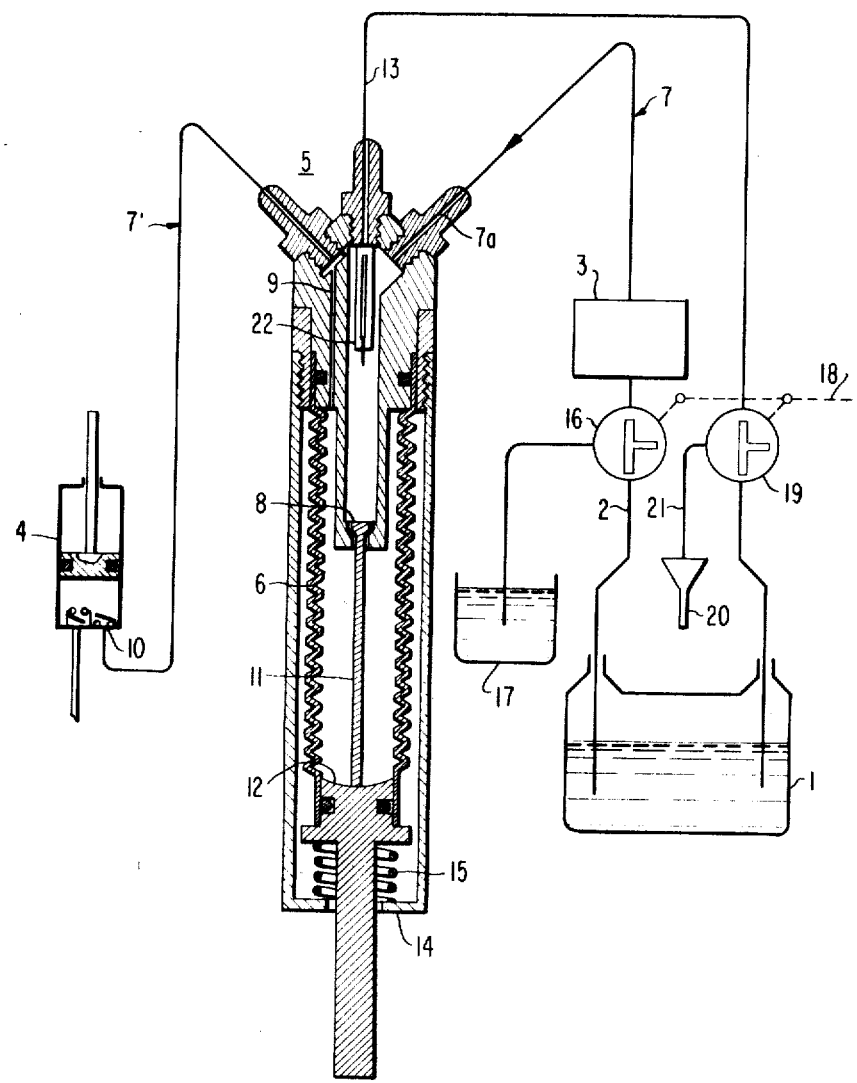
INVENTOR
PALLE-FINN BEER

ANALYTICAL APPARATUS HAVING PRESSURE REGULATOR AND FLUSHING MEANS

This invention relates to an apparatus for regulating liquid pressure and, more particularly, to an apparatus for regulating the liquid pressure supplied by pump to a measuring pipette.

In medical analyses, especially those employing automatic analytical apparatus, it is extremely important in order to obtain good reproducibility in the dosage of, for instance, a reagent liquid dispensed that the pressure on the liquid when it is supplied to a measuring pipette be kept as constant as possible. Most advantageously, this pressure should be maintained at approximately that of the surrounding atmosphere.

One of the reasons why the pressure of the reagent liquid should be constant, and preferably approximately that of the ambient atmosphere, is that there may be dissolved in the liquid a quantity of air. This dissolved air tends to be separate at an underpressure and then to remain separate in the liquid, even if the pressure increases again. This leads to an uncertainty about the quantity of liquid measured owing to the compressibility of the air bubbles formed.

As an additional advantage, which is obtained if the pressure of the liquid is maintained approximately equal to that of the ambient atmosphere, is that the arrangement is less sensitive to influence of possible leakage.

In an attempt to obviate the drawbacks referred to above, it has been proposed to employ a pressure equalizer. This prior art pressure equalizer usually involves the float principle which art means that liquid was supplied to a container through a valve which closed in response to a float swimming on the liquid when the liquid reached a predetermined level. The free space above the liquid in the container was in direct contact with the ambient atmosphere. Since air then contacts the liquid to be regulated, this system is unsuitable for some chemical reactions. Furthermore, the occurence of valve trouble in these systems causes over-flowing of the pressure equalizer which could have disastrous consequences.

It is an object of the present invention to provide an apparatus wherein the pressure of a liquid pumped to a measuring pipette is kept essentially constant.

Another object of the invention is to provide an apparatus which is capable of maintaining the desired pressure control on the liquid pumped to a measuring pipette but which does so without the aforementioned drawbacks of prior pressure equalizers.

Yet, another object of the invention is to provide an apparatus characterized by being an entirely closed system which means that the liquid never comes into contact with air during the passage from a pressure pump connected to a container for the liquid and to a measuring pipette therefor.

These and other objects of the invention are obtained by an apparatus comprising a measuring pipette, a pump, a pressure equalizer, a first means for conveying liquid from said pump to said pipette, a second means for conveying liquid from said pressure equalizer to said measuring pipette, said pressure equalizer comprising a variable volume chamber having an outlet communicating with said second means and an inlet communicating with said first means, valve means disposed within said variable volume chamber, said valve means communicating with said inlet and adapted to close when the variable volume chamber reaches a predetermined volume.

The invention will be further illustrated by reference to the accompanying drawing which is a diagrammatic representation partially in cross section of the apparatus of the invention.

Referring to the drawing, from a container 1 for a liquid, such as a reagent, a supply conduit 2 leads to a pressure pump 3 which is adapted to convey liquid by a first means, such as conduit 7, to a pressure regulator 5. A second means, such as conduit 7', conveys liquid from pressure regulator 5 to a measuring pipette 4 from which the liquid is supplied to a receptacle not shown in the drawing. Since, among other things, the measuring pipette 4 may be at a higher level than container 1, the pump 3 is designed to be well able to overcome the difference in level. This difference in levels, however, may cause the pressure on the liquid supplied to the measuring pipette 4 to be too high. For this reason, a pressure equalizer is provided comprising a variable volume chamber such as bellows 6 to be filled with liquid. The bellows has an inlet 7a communicating with conduit 7. A valve means 8 is disposed in said bellows and communicates with inlet 7a thereby connecting it to pump 3. The bellows 6, furthermore, contains an outlet 9 with communicates with conduit 7' connecting the bellows 6 with pipette 4. Preferably, a nonreturn valve 10 is provided in the outlet conduit 7' in direct connection with the measuring pipette 4.

In the embodiment of the invention herein described, the bellows 6 has the shape of an elongated cylinder, the wall of which is folded into a bellows shape. The valve means 8 is placed near one end wall of the bellows 6 and comprises a valve member connected with a rod 11 which extends towards and is actuated by an end wall 12 in the bellows opposite to the valve means 8. In this case, the rod rests against a concave rounded portion of the end wall 12.

When liquid is supplied to the interior of the bellows 6 by means of pump 3, it expands due to liquid flowing through the valve means 8 into the bellows. When the lower terminal wall 12 has reached the position shown in the drawing, contact between rod 11 and terminal wall 12 is interrupted causing valve means 8 to close, prohibiting liquid flow into the bellows 6. The apparatus also may contain a return conduit 13, by means of which liquid can be returned to the container 1 so that there is thus formed a closed circulation system for the liquid from which the desired amount can be taken off depending on the operation of the measuring pipette. When a certain quantity of liquid is supplied by means of the measuring pipette to a reagent receptacle not shown in the drawing, it is accompanied by a corresponding decrease in volume of the bellows 6, which volume decrease causes valve means 8 to be reopened and the same quantity of liquid to be supplied to bellows 6.

Between lower end wall 12 and a housing 14 surrounding bellows 6, a spring 15 is operating, which spring can be either a tension spring or a pressure spring. Furthermore, spring 15 is adjustable in a manner known per se relative to its effect on end wall 12. Preferably, the apparatus is selected so that if the measuring pipette is at a higher level than the pressure regulator 5, spring 15 is a pressure spring so that a certain overpressure is achieved in the bellows 6 which is able to overcome this difference in level. On the other hand, if the measuring pipette 4 is at a lower level than the pressure regulator 5, it is suitable to design the spring 15 as a tension spring of such proportions that the pressure of the liquid supplied to the measuring pipette 4 is substantially the same as that of the ambient atmosphere.

To enable flushing of the apparatus with a rinsing liquid for cleaning purposes, a two-way valve 16 is inserted in the supply conduit 2 between the container 1 and the pump 3, whereby the pump 3 can be alternately connected with the container 1 or with a container 17 for rinsing liquid. The two-way valve 16 is connected mechanically by means of an actuating member 18 which may be pneumatically actuated with a second two-way valve 19 inserted in return conduit 13. Two-way valve 19 permits return conduit 13 to be alternately connected with the container 1 for returning reagent liquid to the container or with a conduit 21 which connects it with a means 20 for receiving rinsing liquid as, for instance, a sink.

If the conduit 21 issues at a level which is substantially below that of the liquid in the container 17, it would be possible through the siphon effect for liquid to flow from the container 17 through valve 16, pump 3, conduits 7 and 13 and valve 19 as well as conduit 21 during the time when the system is not to be flushed. This liquid would then be lost. To prevent this, there is inserted a nonreturn valve 22 in the connection between the conduits 7 and 13 having a valve member which is loaded by a small load corresponding to a head of water somewhat larger than the difference in level between that of the liquid in the container 17 and the mouth of the conduit 21. When the arrangement including the pump 3 is inoperative, the valve 22 is, therefore, closed so that the container 17 cannot be emptied owing to siphon effect. The pressure that then acts on the valve member of the valve 22 is substantially lower than that caused by the pump 3 and the valve 22 will, therefore, open immediately when the pump 3 starts operating.

It is claimed:

1. An apparatus for regulating the liquid pressure in a measuring pipette which comprises a measuring pipette, a pump, a pressure equalizer, a first means for conveying liquid from said pump to said pressure equalizer, a second means for conveying liquid from said pressure equalizer to said measuring pipette, said pressure equalizer comprising a variable volume chamber having an outlet communicating with said second means and an inlet communicating with said first means, valve means disposed in said variable volume chamber, said valve means communicating with said inlet and adapted to close when the variable volume chamber reaches a predetermined volume.

2. The apparatus of claim 1 wherein the variable volume chamber is a bellows.

3. The apparatus of claim 2 wherein the bellows contains an end wall opposite said valve means and said valve means having a valve member connected to a rod extending to and actuated by said end wall.

4. The apparatus of claim 1 provided with a storage container and a return conduit means connecting said pressure equalizer and said storage container for returning liquid from said pressure equalizer to said storage container, and a supply conduit means connecting said storage container and said pump.

5. The apparatus of claim 4 wherein a nonreturn valve is provided said return conduit means.

6. The apparatus of claim 4 containing means for supplying rinsing liquid, means for receiving rinsing liquid, a two-way valve in said supply conduit means connecting said means for supplying rinsing liquid with said pump, and a two-way valve in said return conduit means connecting said means for receiving rinsing liquid with said return conduit means.

* * * * *